United States Patent [19]
Eleftheriadis et al.

[11] Patent Number: 6,044,397
[45] Date of Patent: Mar. 28, 2000

[54] SYSTEM AND METHOD FOR GENERATION AND INTERFACING OF BITSTREAMS REPRESENTING MPEG-CODED AUDIOVISUAL OBJECTS

[75] Inventors: Alexandros Eleftheriadis; Yihan Fang, both of New York; Atul Puri, Riverdale, all of N.Y.; Robert Lewis Schmidt, Howell, N.J.

[73] Assignees: AT&T Corp; Columbia University, New York, N.Y.

[21] Appl. No.: 09/055,929

[22] Filed: Apr. 7, 1998

Related U.S. Application Data
[60] Provisional application No. 60/042,801, Apr. 7, 1997.

[51] Int. Cl.[7] .............................. H04N 7/10; H04H 1/02
[52] U.S. Cl. .............................. 709/217; 348/10; 455/6.2
[58] Field of Search ..................................... 709/217–219; 345/327; 348/6, 7, 10, 12, 13, 725–728; 455/3.1–6.3; 370/536, 542

[56] References Cited

U.S. PATENT DOCUMENTS 5,563,648  10/1996  Menand et al. ............................ 348/13
5,794,250   8/1998  Cariño, Jr., et al. ..................... 707/104

OTHER PUBLICATIONS

J. Laier et al., "Content–Based Multimedia Data Access in Internet Video Communication", *First International Workshop on Wireless Image/Video Communications*, Sep. 1996, pp. 126–133.

A. Eleftheriadis et al., "Stored File Format for Object–based Audio Visual Representation", pp. 1–8.

A. Basso et al., "Improved Data Access and Streaming Modes for the MPEG–4 File Format", pp. 1–12.

J. Heid, "Watch This: Streaming Video on Your Web Site", *create WEB*, Apr. 1998, pp. 109–112.

A. Griffin, "Video on the Net", *Popular Mechanics*, Mar. 1998, pp. 51–53.

A. Eleftheriadis et al., "Stored File Format for MPEG–4", *International Organization for Standardization*, ISO/IEC JTC1/SC29/WG11 MPEG97/M2062, Apr. 1, 1997, pp. 1–4.

A. Puri et al., "APIs for MPEG–4 Systems", *International Organization for Standardization*, ISO/IEC JTC1/SC29/WG11 MPEG97/2133, Apr. 1997.

A. Basso et al., "MPEG–4 Integrated Intermedia Format (IIF): Basic Specification", *International Organization for Standardization*, ISO/IEC JTC1/SC29/WG11 MPEG98/M2978, Jan. 16, 1998, pp. 1–22.

*Primary Examiner*—John W. Miller

[57] ABSTRACT

The invention provides a standardized interface facility for MPEG-4 authoring, bitstream manipulation, editing and interpretation, with associated tools and interfaces to, resulting in coded bitstreams which are easier to test, check and debug while conforming to the MPEG-4 standard. The specified interfaces can also facilitate graceful degradation in the face of decreased resources by allowing editing of bitstreams. The specified interfaces can also allow creation of decodable bitstreams in response to the user requests either directly or indirectly embedded in audiovisual applications, as well as future services. The invention specifies a bitstream input/output package in the Java programming language to facilitates bitstream encoding and decoding of audio-visual media objects, especially when coding uses the MPEG-4 standard. The invention separates fixed length and variable length coding, and allows flexible parsing which offers the potential of optimized implementation as needed to aid real-time or near real-time operation.

20 Claims, 4 Drawing Sheets

SYSTEM AND METHOD FOR GENERATION AND INTERFACING OF BITSTREAMS REPRESENTING MPEG-CODED AUDIOVISUAL OBJECTS

CROSS-REFERENCE TO RELATED APPLICATION

This application is related to U.S. Provisional Application Serial No. 60/042,801, from which priority is claimed.

BACKGROUND OF THE INVENTION

1. Field of Invention

The invention relates to the field of coded multimedia and its storage, transmission and delivery to users, and more particularly to such coding when a flexible means for generating, editing or interpreting bitstreams representing multimedia objects is necessary.

2. Description of Related Art

Digital multimedia offers advantages of manipulation, multigeneration processing and error robustness and others, but incurs constraints due to the storage capacity or transmission bandwidth required. Multimedia content thus frequently needs to be compressed or coded. Further, in the wake of rapid increases in demand for digital multimedia over the Internet and other networks, the need for efficient storage, networked access and search and retrieval has increased, and a number of coding schemes, storage formats, retrieval techniques and transmission protocols have evolved. For instance, for image and graphics files, GIF, TIF and other formats have been used. Similarly, audio files have been coded and stored in RealAudio, WAV, MIDI and other formats. Animations and video files have often been stored using GIF89a, Cinepak, Indeo and others. To play back the plethora of existing formats, decoders and interpreters are often needed, and may offer various degrees of speed, quality and performance depending on whether these decoders and interpreters are implemented in hardware or in software, and particularly in the case of software, on the capabilities of the host computer. If multimedia content is embedded in web pages accessed via a computer (e.g. a PC), the web browser needs to be set up correctly for all the anticipated content and must recognize each type of content and support a mechanism of content handlers (software plugins or hardware) to deal with such content.

The need for interoperability, guaranteed quality and performance and economies of scale in chip design, as well as the cost involved in content generation for multiplicity of formats, has led to advances in standardization in the areas of multimedia coding, packetization and robust delivery. In particular, International Standards Organization Motion Pictures Experts Group (ISO MPEG) has standardized bitstream syntax and decoding semantics for coded multimedia in the form of two standards, referred to as MPEG-1 and MPEG-2. MPEG-1 was primarily intended for use on digital storage media (DSM) such as compact disks (CDs), whereas MPEG-2 was primarily intended for use in broadcast environment (transport stream), although it also supports MPEG-1 like mechanism for use on DSM (program stream). MPEG-2 also included additional features such as DSM-Control and Command for basic user interaction, as may be needed for standardized playback of MPEG-2, either standalone or networked. With the advent of inexpensive boards and PCMCIA cards and the availability of fast Central Processing Units (CPUs), the MPEG-1 standard is becoming commonly available for playback of movies and games on PCs. The MPEG-2 standard, on the other hand, since it addresses relatively higher quality applications, is becoming common for entertainment applications via digital satellite TV, digital cable and Digital Versatile Disk (DVD). Besides the applications/platforms noted, MPEG-1 and MPEG-2 are expected to be utilized in various other configurations, in streams communicated over network, streams stored on hard disks or CDs, and in the combination of networked and local access.

The success of MPEG-1 and MPEG-2, the bandwidth limitations of Internet and mobile channels, the flexibility of web based data access using browsers, and the increasing need for interactive personal communication has opened up new paradigms for multimedia usage and control. In response, ISO-MPEG has developed a new standard, called MPEG-4. The MPEG-4 standard has addressed coding of audio-visual information in the form of individual objects, and a system for composition and synchronized playback of these objects. While development of MPEG-4 for such fixed systems continues, in the meantime new paradigms in communication, software and networking such as that offered by the Java language have offered new opportunities for flexibility, adaptivity and user interaction. For instance, the Java language offers networking and platform independence critical to downloading and executing of applets (java classes) on a client PC from a web server which hosts the web pages visited by the user. Depending on the design of the applet, either a single access to the data stored on the server may be needed and all the necessary data may be stored on the client PC, or several partial accesses (to reduce storage space and time needed for startup) may be needed. The later scenario is referred to as streamed playback.

As noted, when coded multimedia is used for Internet and local networked applications on a computer, say a PC, a number of situations may arise. First, the bandwidth for networked access of multimedia may be either limited or time-varying, necessitating transmission of the most significant information only and followed by other information as more bandwidth becomes available. Second, regardless of the bandwidth available, the client side PC on which decoding may have to take place may be limited in CPU and/or memory resources, and furthermore, these resources may also be time-varying. Third, a multimedia user (consumer) may require highly interactive nonlinear browsing and playback. This is not unusual since a lot of textual content on web pages is capable of being browsed via use of hyperlinked features, and the same paradigm is expected for presentations employing coded audio-visual objects. The MPEG-4 system without enhanced capabilities may only be able to deal with the aforementioned situations in a very limited way.

The use of application programming interfaces (APIs) has long been recognized in the software industry as a means to achieve standardized operations and functions over a number of different types of computer platforms. Typically, although operations can be standardized via definition of API, the performance of these operations may differ on various platforms as specific vendors with interest in a specific platform may provide implementations optimized for that platform. In the field of graphics, Virtual Reality Modeling Language (VRML) allows a means of specifying spatial and temporal relationships between objects and description of a scene by use of a scene graph approach. MPEG-4 has used a binary format screen representation (BIFS) of the constructs central to VRML and extended VRML in many ways to handle real-time audio/video data and effects such as facial or body animation. Since the MPEG-4 standard offers many tools for coding of various types of media as well as scene graph representation, and further, each media coding may involve separate coding of individual objects, an organized yet flexible mechanism for bitstream generation, editing and interpretation is highly desirable.

SUMMARY OF THE INVENTION

The invention addresses standardized interfaces for MPEG-4 authoring, bitstream manipulation, editing and interpretation. The invention provides tools and interfaces to considerably facilitate the aforementioned operations, resulting in coded bitstreams which are easier to test, check and debug while conforming to the MPEG-4 standard. The specified interfaces can also facilitate graceful adaptation by allowing editing of bitstreams when sufficient processing resources may not exist. The specified interfaces can also allow creation of decodable bitstreams in response to the user request either directly or indirectly embedded in audiovisual applications and services expected to be important in near future. Thus, the current invention, not only addresses the shortcomings of a conventional system of bitstream encoding and decoding, but also offers tools which can be integrated into more adaptive systems such as that supporting graceful degradation as well as responsiveness to user interaction.

Specifically, the invention provides a system and interfacing method facilitating flexible generation, editing and interpretation of bitstreams representing audio-visual objects coded by the MPEG-4 standard. The invention specifies a bitstream input/output package in Java programming language to facilitates bitstream encoding and decoding of audio-visual media objects, especially when coding is per the MPEG-4 standard. This is due to the fact that the proposed package separates fixed length and variable length coding and allows flexible parsing which offers the potential of optimized implementation as needed to aid real-time or near real-time operation.

The invention is motivated in part by the desirability of standardized interfaces for MPEG-4 authoring, bitstream manipulation, editing and interpretation. One goal of the invention is to provide tools and interfaces to considerably facilitate the aforementioned audiovisual operations, resulting in coded bitstreams which are easier to test, check and debug while conforming to the MPEG-4 standard. The interfaces specified in the invention can also facilitate the graceful adaptation by allowing editing of bitstreams when sufficient processing resources may not exist. The specified interfaces can also allow creation of decodable bitstreams in response to the user request either directly or indirectly embedded in audiovisual applications and services expected to be important in the future.

BRIEF DESCRIPTION OF THE DRAWINGS

The invention will be described with reference to the accompanying drawings, in which like elements are designated by like numbers and in which.

DETAILED DESCRIPTION OF PREFERRED EMBODIMENTS

The invention provides an integrated interface facility for processing streamed audiovisual information, and will be illustratively described in the MPEG-4 environment. The interface facility provided by the invention includes a bitstream input/output library for flexible generation, editing and interpretation of bitstreams representing individual audiovisual objects coded using the MPEG-4 standard. In one aspect the invention defines a bitstream input/output package in the Java language. This package, mpgj.bitsio, can be added to the standard Java libraries known in the art, and simplify the bitstream Input and Output operations, including fixed length and variable length coding common in MPEG-4 syntax decoding. Among other advantages, the package is organized to facilitate optimization for maximum speed. For example, the variable length code parsing module could use configurable multi-stage parallel lookups to further aid real-time or near real-time operation.

TABLE 1

The bitstream input/output library of invention

| # | Classes | Explanation |
|---|---------|-------------|
| 1. | InputStream | This class provides the bitstream input capabilities |
| 2. | Map | This class is used by the InputStream and OutputStream classes |
| 3. | OutputStream | This class provides the bitstream output capabilities |

The library is the Java equivalent of bits input/output portion of MSDL-S (MPEG-4 Syntactic Description Language) known in the art. In fact, the invention can also be used internally by the MSDL-S to Java translator (flavorj).

Figure 1A:
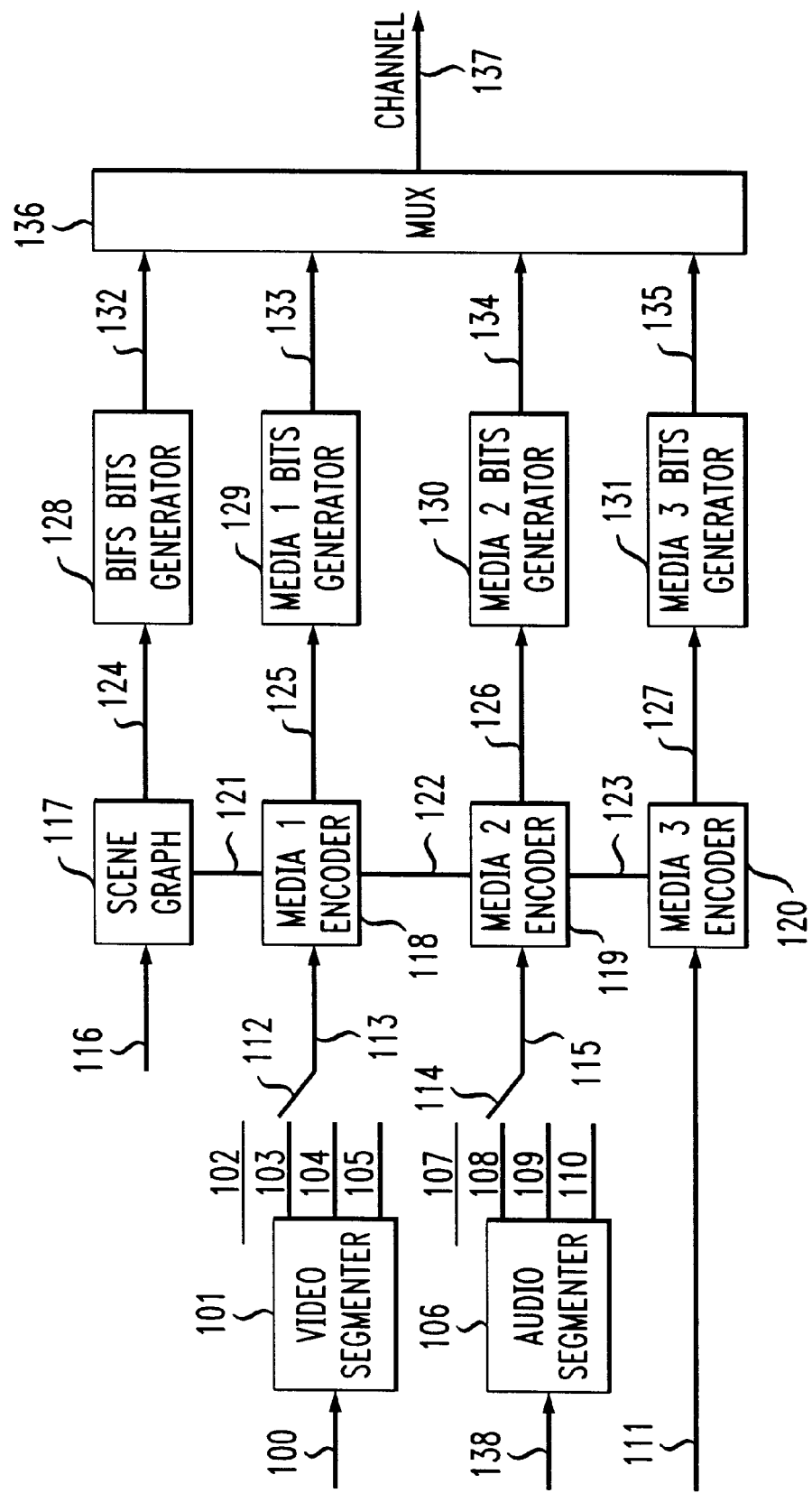
FIG. 1A illustrates a block diagram of the encoding system with details illustrating an embodiment of the invention.

FIG. 1A illustrates a block diagram of an encoding system with details illustrating an embodiment of the invention. A natural source video scene to be coded is input via line 100 to Video Segmenter 101, which segments the scene into a number of semantic objects and are output on lines 103, 104,105. Other video objects external to be scene can also be mixed such as that on line 102. Next, video objects 102, 103,104,105, sequentially pass through the switch 112 and are available one after the other on line 113, an input to Media1 Encoder 118. In parallel, a natural source audio scene to be coded on line 138 is segmented by Audio Segmenter 106 into individual objects, 108, 109, 110, and any external objects 107. Next, audio objects 107,108,109, 110 sequentially pass through switch 114 and are available one after the other on line 115, an input to Media2 Encoder. Besides natural audio and video objects, synthetic objects, either aural or visual are input to line 111, an input to Media3 Encoder, 120. Based on content authors input, 116, a description of scene is also generated optionally in Scene Graph 117, which is output on line 124. SceneGraph 117 also generates an optional control signal which is sent to each of the media encoders, for example to Media1 Encoder 118 over line 121, to Media2 Encoder 119 over line 122 and Media3 Encoder 120 over line 127.

Although three media encoders are shown, there is no limit on the number of media encoders that can be employed according to the invention. Further, it is possible that a media encoder may itself consist of subencoders. The output of media encoders on lines 125,126 and 127 forms input to respective media bits(tream) generators, Media1 Bits Generator 129, Media2 Bits Generator 130 and Media3 Bits Generator 131. The output of Scene Graph 117 on line 124 forms input to BIFS Bits Generator 128. BIFS Bits Generator 128 as well as Media Bits Generators 129,130 and 131 are assumed to employ interfaces of this invention detailed in FIG. 2. The output of various bits generators on lines 132, 133 and 134 and 135 are fed to systems multiplexer, Mux, 136. The multiplexed bitstream is available on Channel 137 for storage or transmission.

Figure 1B:
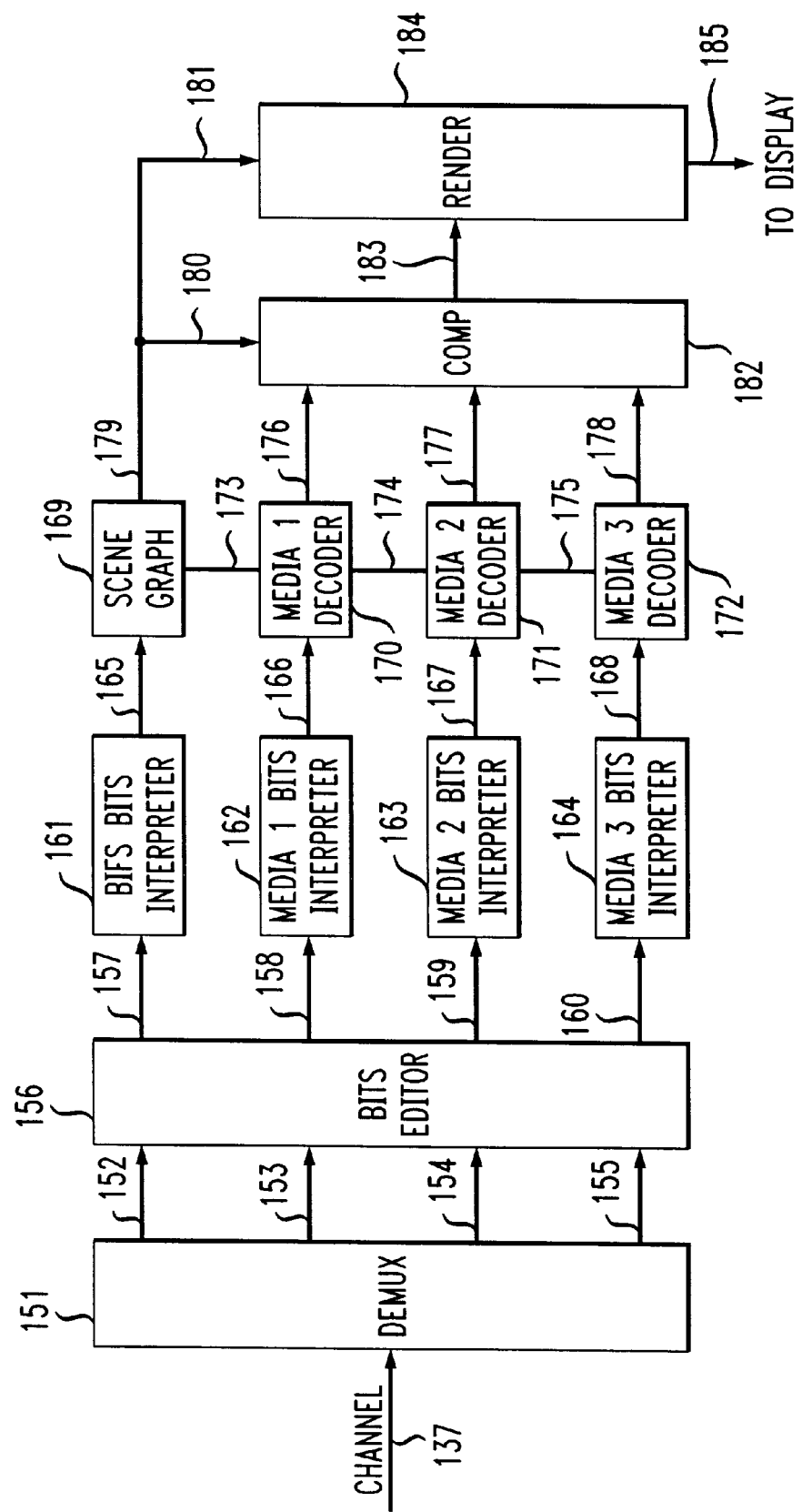
FIG. 1B illustrates a block diagram of the decoding system with details illustrating the embodiment of the invention.

FIG. 1B illustrates a block diagram of the decoding operation of the invention, in more detail. Besides a few exceptions, the operation of this aspect of the invention is the inverse of that of the coding depicted in FIG. 1A. The multiplexed bitstream (either from storage or transmission) is available on Channel 137 and is input to demultiplexer Demux 151, which separates that stream into individual bitstreams, such as visual (natural and synthetic video objects), audio (natural and synthetic audio objects), BIFS scene description etc. The BIFS scene bitstream is available on line 152, video objects bitstream on line 153, audio objects bitstream on line 154 and synthetic (visual or audio) objects bitstream on line 155 and forms inputs to the Bits(tream) Editor 156, which responds to the several conditions requiring graceful degradation or functionalities on user request. The Bits Editor 156 can be used for real-time as well as non realtime editing of bitstreams, and employs interfaces of this invention, as detailed in FIG. 3.

The modified bitstreams, BIFS Bits on line 157, Media 1 Bits on line 158, Media 2 Bits on line 159, Media3 Bits on line 160 are input to the respective bitstream interpreters, BIFS Bits Interpreter 161, Media1 Bits Interpreter 162, Media2 Bits Interpreter 163, Media3 Bits Interpreter 164 which output respective streams of symbols on lines 165, 166, 167 and 168. The bitstream interpreters use interfaces of FIG. 3 of the invention The BIFS symbols on line 165 are decoded to form a Scene Graph on line 179, various types of Media symbol streams on lines 166, 167, 168 are decoded by respective media decoders, Media1 Decoder 170, Media2 Decoder 171 and Media3 Decoder 172 and the decoded media streams (video objects, audio objects, synthetic objects etc.) are output on lines 176,177 and 178. The various media decoders are instantiated by Scene Graph 169 and controls to these decoders are shown; Media1 Decoder is controlled via line 173, Media2 Decoder is controlled via line 174 and Media3 Decoder is controlled via line 175. A Comp(ositor) 182 takes as input the Scene Graph on line 180, and the output of the three media decoders on lines 176,177 and 178 and composes a scene to be presented to viewer/user, but first, the output of the compositor on line 183 is transmitted to the renderer which is also controlled by the Scene Graph on line 181, and renders the composited scene.

Figure 2:
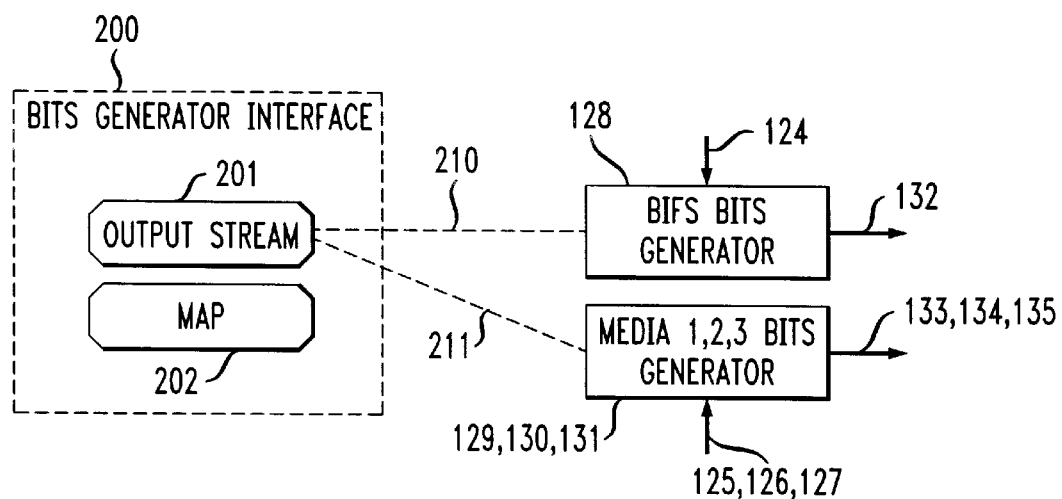
FIG. 2 illustrates bitstream generation interface according to the invention.

FIG. 2 illustrates the bitstream generation interface according to the invention. The BIFS Bits Generator 128 takes as input BIFS symbols on line 124 and outputs corresponding coded representation in the form of bitstream on line 132. Similarly, Media1,2,3 Bits Generators, 129,130, 131 take as input media symbols on lines 125,126 and 127 and output the corresponding coded representation in the form of bitstreams on lines 133,134 and 135 respectively. The BIFS Bits Generator 128 as well as Media1,2,3 Bits Generator 129,130,131 employ Bits Generator Interface, 200 of the invention. Bits Generator Interface 200 consists of Java classes such as OutputStream, 201, and Map, 202. The interface operation of these classes is described as follows.

Class mpgj.bitsio.OutputStream
java.lang.Object
 |
 + - - - mpgj.bitsio.OutputStream
 public class OutputStream extends Object
OutputStream is the basic interface to the output stream.

Constructors public OutputStream(FileOutputStream file)
Constructs a new OutputStream in a file.
 public OutputStream(string bits)
Constructs a new OutputStream in a string.

Methods public void align(int numbits)
Align with next bit boundary that is a multiple of numbits. Bits between the current pointer and the alignment boundary are written out as zeros.
 public void align(string stuffing[ ], int numbits)
Align with next bit boundary that is a multiple of numbits. Bits between the current pointer and the alignment boundary are stuffed according to the stuffing string.
 public boolean eos( )
Return true on end-of-stream or error, else return false.
 public boolean error( )
Return true on error, else return false.
 public void putbits(int numbits, int value)
Put an unsigned integer using the specified number of bits. Sets error flag if stream cannot be written or value is negative.
 public void putsbits(int numbits, int value)
Put a signed integer using the specified number of bits. The last bit is set to be sign bit. Sets error flag if stream cannot be written.
 public void putvlc(Map map, int value)
Put specified value using the specified map. Sets error flag if stream cannot be written.

Class mpgj.bitsio.Map
java.lang.Object
 |
 + - - - mpgj.bitsio.Map
 public class Map extends Object
A map table for fixed or variable length coding.

Constructors public Map(FileInputStream file, int step)
Constructs a new map reading from a file, using specified step for lookups.
 public Map(FileInputStream file)
Constructs a new map reading from a file. Every lookup advances 1 bit.
 public Map(string[ ] bitstring, int[ ] value, int array_size, int step)
Constructs a new map from a string array and an integer array knowing array size and specified step.
 public Map(string[ ] bitstring, int[ ] value, int array_size)
Constructs a new map from a string array and an integer array knowing array size. Every lookup advances 1 bit.

Methods

No user-level methods are provided.

Figure 3:
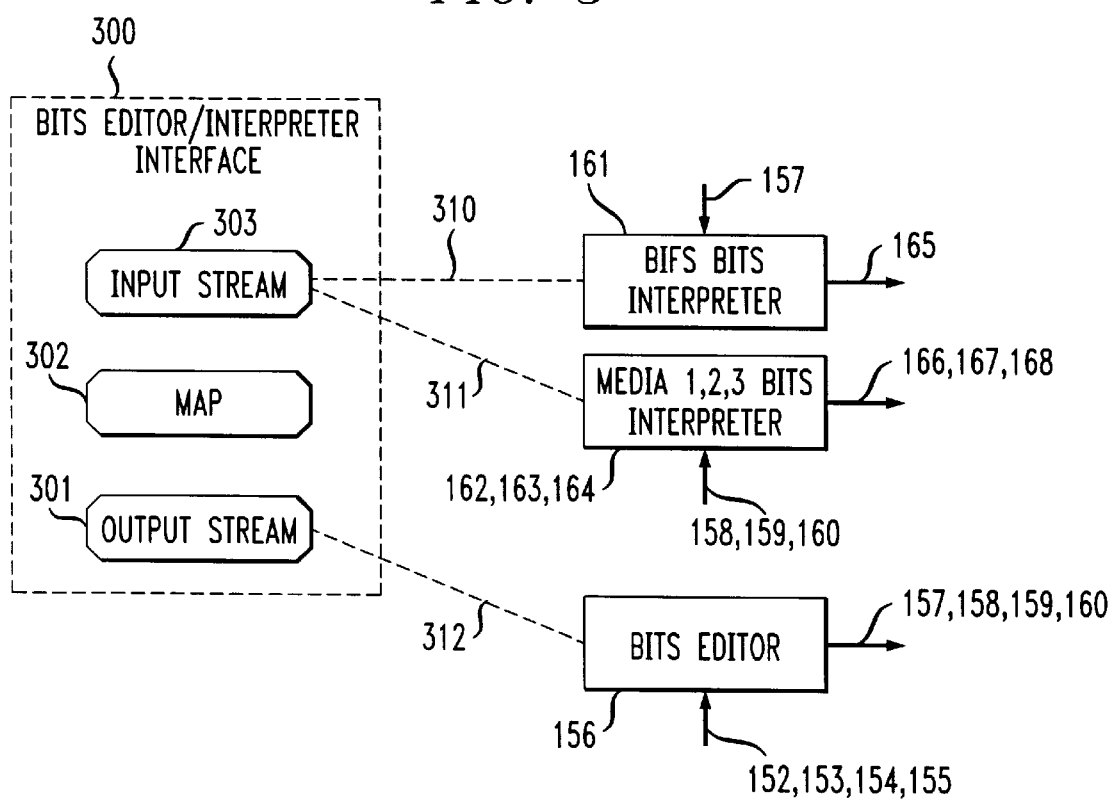
FIG. 3 illustrates bitstream editing and interpretation interface according to the invention.

FIG. 3 illustrates a bitstream editing and interpretation interface according to the invention. The BIFS Bits Interpreter 161 takes as input BIFS bitstream on line 157 and outputs corresponding decoded symbols on line 165.

Similarly, Media1,2,3 Bits Interpreters, 162,163,164 take as input media bitstreams on lines 158,159 and 160 and output the corresponding decoded symbols on lines 166,167 and 168 respectively. The BIFS Bits Interpreter 161 as well as Media1,2,3 Bits Interpreter 162,163,164 employ Bits Editor/Interpreter Interface, 300 of this invention. Bits Editor/Interpreter Interface 300 consists of Java classes such as InputStream 303, Map 302, and OutputStream, 301. Besides bitstream interpretation, the interfaces of this figure also support bitstream editing.

The bitstream editing operations are in general similar to the bitstream generation process. For instance, Bits Editor 156 takes as input the demultiplexed BIFS and media bitstreams on lines 152,153,154, 155 and outputs the corresponding modified (edited bitstreams) on respective lines 157,158,159,160. The editing operation can be in response to the need to discard objects due to overloaded system resources, or to that of user interaction, and is enabled by BIFS Editor/Interpreter Interface, 300. As noted, this interface supports InputStream and Map classes, however the interface also supports OutputStream class, the later (along with Map) needed for bitstream editing operations. The interface operation of OutputStream and Map classes were discussed earlier (in conjunction with FIG. 2). The interface operation of InputStream class is as follows.

Class mpgj.bitsio.InputStream
java.lang.Object
|
+ - - - mpgj.bitsio.InputStream
public class Input Stream extends Object
This class is the basic interface to the input stream.

Constructors
public InputStream(FileInputStream file)
Constructs a new InputStream from a file.
public InputStream(string bits, int length)
Constructs a new InputStream from a string with given length.

Methods
public void align(int numbits)
Align with next bit boundary that is a multiple of numbits. Bits between the current pointer and the alignment boundary are read in and discarded.
public boolean eos( )
Return true on end-of-stream, else return false.
public boolean error( )
Return true on error, else return false.
public int getbits(int length)
Get an unsigned integer from specified number of bits. Sets eos flag on end-of-stream. Sets error flag if stream cannot be read.
public int getsbits(int length)
Get a signed integer from specified number of bits (length-1). The last bit indicates the sign of the integer. Sets eos flag on end-of-stream. Sets error flag if stream cannot be read.
public int nextbits(int length)
Probe next specified number of bits. Return value as 32-bit integer. Do not advance current pointer. Sets error flag if stream cannot be read.
public void skipbits(int length)
Skip specified number of bits. Sets eos flag on end-of-stream.
public int getvlc(Map map)
Get variable or fixed length code according to specified vlc map. Return value as 32-bit integer. Sets eos flag on end-of-stream. Sets error flag if stream cannot be read.

public int nextvlc(Map map)
Probe variable or fixed length code according to specified vlc map. Return value as 32-bit integer. Sets eos flag on end-of-stream. Sets error flag if stream cannot be read.

Figure 4:
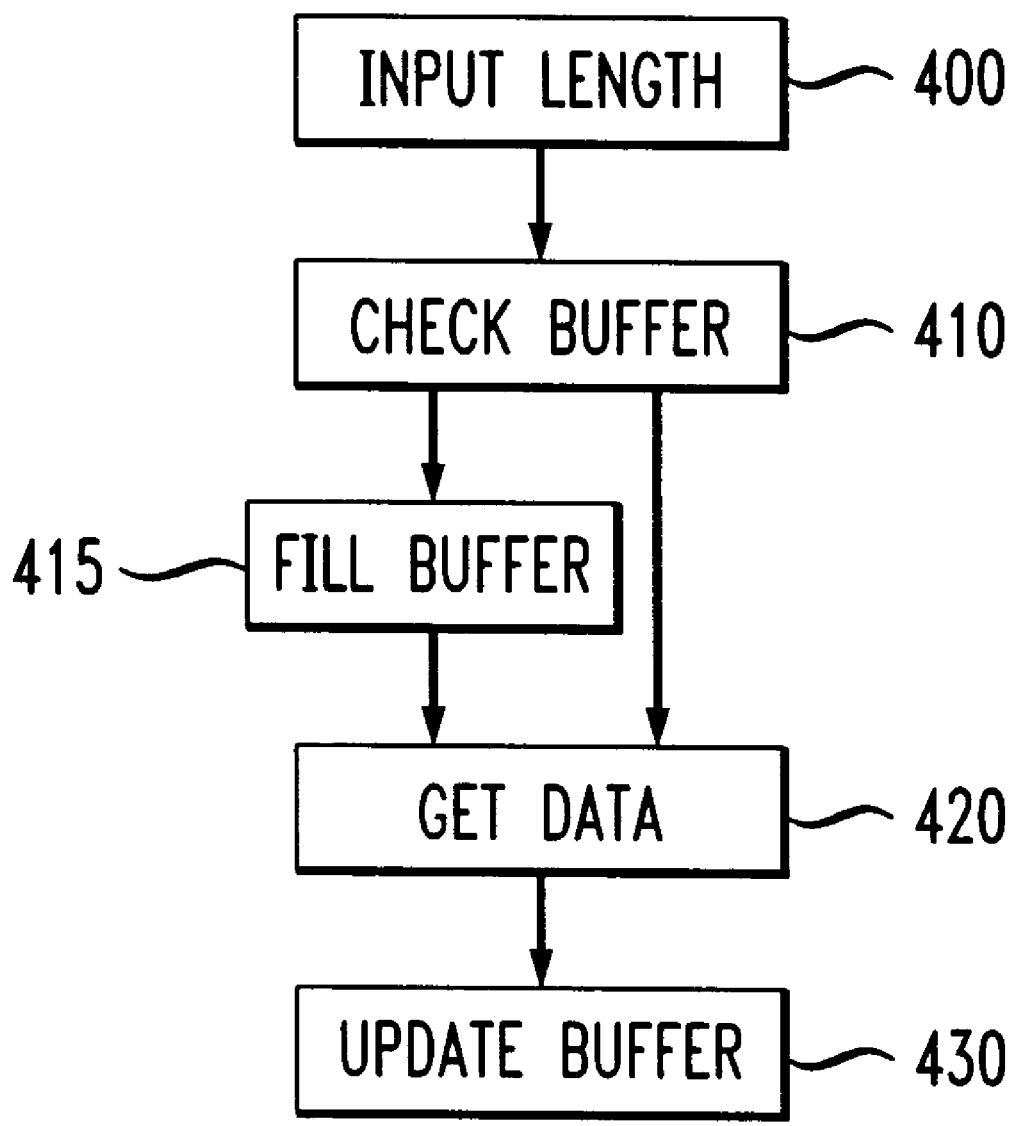
FIG. 4 illustrates a flowchart depicting a buffer updating process used in the invention.

An aspect of the foregoing routines, generally related to processing given lengths of bit strings using a data buffer, is illustrated in FIG. 4. In that figure, an input length is read at 400, after which a data buffer is checked at step 410. According to the desired operation, the buffer may be filled (415) or read out (420) according to bitlength or other parameters, after which the buffer is updated (step 430).

In the implementation of the invention, a flexible bitstream facility is introduced, establishing core routines to enable simpler as well as more complicated control of embedded audiovisual objects, all in a universal and consistent streamed manner.

The foregoing description of the system and method of the invention is illustrative, and variations in construction and implementation will occur to persons skilled in the art. For instance, while an illustrative set of streaming functions have been described, functions can be added or subtracted according to changing network, application or other needs. The scope of the invention is intended to be limited only by the following claims.

What is claimed is:

1. A system for processing streaming audiovisual objects coded according to the MPEG-4 standard, comprising:
    a streaming interface library containing a predetermined set of streaming control functions processing audiovisual objects, each of the control functions having predefined function calls; and
    a processor, configured to access the streaming interface library, and to decode and process streamed audiovisual objects according to the function calls.

2. The system of claim 1, wherein the processor unit executes a client application invoking the function calls.

3. The system of claim 1, further comprising a user input unit, the user input unit communicating with the processor unit and invoking selected function calls.

4. The system of claim 1, wherein the interface library comprises a visual decoding interface to decode visual objects in audiovisual bitstreams.

5. The system of claim 1, wherein the streaming interface library comprises a generation function for generating and outputting audiovisual data streams.

6. The system of claim 1, wherein the streaming interface library comprises an editing function for editing and manipulating audiovisual bitstreams.

7. The system of claim 1, wherein the streaming interface library comprises an interpreting function for interpreting audiovisual bitstreams.

8. The system of claim 1, wherein the processor unit adapts the execution of the bitstream interface library according to varying system resources.

9. The system of claim 1, further comprising a client application interface, the client application interface invoking additional bitstream functions presented by cooperating client applications.

10. The system of claim 1, further comprising a multimedia browser module employing the bitstream interface library for user viewing.

11. A method for processing streaming audiovisual objects coded according to the MPEG-4 standard, comprising:
    presenting a streaming interface library containing a predetermined set of streaming control functions processing audiovisual objects, each of the control functions having predefined function calls; and processing calls to the streaming interface library to decode and process streamed audiovisual objects according to the function calls.

12. The method of claim 11, wherein the step of processing comprises the step of executing a client application invoking the function calls.

13. The method of claim 11, further comprising the step of receiving user input, the user input invoking selected function calls.

14. The method of claim 11, wherein the streaming interface library comprises a visual decoding interface to decode visual objects contained in audiovisual bitstreams.

15. The method of claim 11, wherein the streaming interface library comprises a generation function for generating and outputting audiovisual data streams.

16. The method of claim 11, wherein the streaming interface library comprises an editing function for editing and manipulating audiovisual bitstreams.

17. The method of claim 11, wherein the streaming interface library comprises an interpreting function for interpreting audiovisual bitstreams.

18. The method of claim 11, wherein the step of processing comprises the step of adapting the execution of the bitstream interface library according to varying system resources.

19. The method of claim 11, further comprising the step of providing a client application interface, the client application interface invoking additional bitstream functions presented by cooperating client applications.

20. The method of claim 11, further comprising the step of providing a multimedia browser module employing the bitstream interface library for user viewing.

* * * * *